(12) United States Patent
Wakamura et al.

(10) Patent No.: US 8,354,049 B2
(45) Date of Patent: Jan. 15, 2013

(54) PHOTOCATALYTIC APATITE-CONTAINING RESIN

(75) Inventors: Masato Wakamura, Sakai (JP); Noriyasu Aso, Isehara (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/783,238

(22) Filed: May 19, 2010

(65) Prior Publication Data

US 2010/0227980 A1 Sep. 9, 2010

Related U.S. Application Data

(60) Division of application No. 11/325,491, filed on Jan. 5, 2006, now Pat. No. 7,750,064, which is a continuation of application No. PCT/JP2004/009821, filed on Jul. 9, 2004.

(30) Foreign Application Priority Data

Jul. 11, 2003 (JP) ................................. 2003-195483

(51) Int. Cl.
 *H01H 13/02* (2006.01)
 *C09D 5/16* (2006.01)
 *B28B 5/00* (2006.01)
 *B29C 65/00* (2006.01)
 *B01J 23/02* (2006.01)
 *B01J 27/14* (2006.01)

(52) U.S. Cl. ................... 264/241; 264/331.11; 502/208; 502/210; 502/213; 523/122

(58) Field of Classification Search ................... 522/406, 522/413, 414; 264/104, 320, 328.1, 331.11, 264/331.16, 331.17, 331.18, 331.19, 331.21, 264/241; 523/122; 502/406, 413, 414, 208, 502/210, 213

See application file for complete search history.

(56) References Cited

U.S. PATENT DOCUMENTS

| | | | | |
|---|---|---|---|---|
| 5,981,425 | A | 11/1999 | Taoda et al. | 502/208 |
| 6,048,626 | A * | 4/2000 | Tsuzuki et al. | 428/480 |
| 6,090,736 | A * | 7/2000 | Taoda et al. | 502/5 |

(Continued)

FOREIGN PATENT DOCUMENTS

JP 9-102238 4/1997

(Continued)

OTHER PUBLICATIONS

JP 2000-327315, machine translation obtained from the JAP website, Fujitsu LTD, Nov. 28, 1000.*

(Continued)

*Primary Examiner* — Susan W Berman
(74) *Attorney, Agent, or Firm* — Kratz, Quintos & Hanson, LLP

(57) ABSTRACT

An antibacterial measure using titanium oxide includes mixing titanium oxide in a resin to form a coating resin, and then coating a key surface with the coating resin. This method requires formation of a coating layer on a resin molding and thus increases the number of the production steps and cost. Furthermore, in the method, a coating film containing an antibacterial agent is scraped off light by little at each time of keying, and thus the film is finally completely removed to lose its antibacterial function. A conceivable measure against this includes directly mixing a resin and an antibacterial agent. However, titanium oxide used as an antibacterial agent degrades a raw material resin. It has recently be thought that photocatalytic apatite as a substitute for titanium oxide also causes chalking, and an antibacterial coating layer has been formed on a surface of a resin molding. However, the inventor of the present invention found that photocatalytic apatite does not cause chalking, thereby achieving a resin containing the photocatalytic apatite.

10 Claims, 4 Drawing Sheets

U.S. PATENT DOCUMENTS

| | | | | |
|---|---|---|---|---|
| 6,162,533 | A | 12/2000 | Onozawa et al. | 428/323 |
| 6,683,023 | B2 | 1/2004 | Ito et al. | 502/350 |
| 6,777,357 | B2 | 8/2004 | Aso et al. | 501/1 |
| 6,825,155 | B2 | 11/2004 | Nonami et al. | 510/116 |
| 7,056,968 | B2 * | 6/2006 | Hiraide et al. | 524/414 |
| 7,060,643 | B2 | 6/2006 | Sanbayashi et al. | 501/162 |
| 7,097,457 | B2 | 8/2006 | Kajino et al. | 434/112 |
| 7,157,503 | B2 | 1/2007 | Wakamura | 523/122 |
| 7,250,453 | B2 * | 7/2007 | Sakuma et al. | 523/122 |
| 7,378,371 | B2 | 5/2008 | Tanaka et al. | 502/350 |
| 7,414,009 | B2 | 8/2008 | Tanaka et al. | 502/350 |
| 7,579,296 | B2 | 8/2009 | Naganuma et al. | 502/228 |
| 7,635,659 | B2 | 12/2009 | Naganuma et al. | 502/208 |
| 2005/0201907 | A1 | 9/2005 | Wakamura | 422/186.3 |
| 2006/0150818 | A1 | 7/2006 | Okamoto et al. | 96/223 |
| 2006/0177671 | A1 | 8/2006 | Nakayama et al. | 428/447 |

FOREIGN PATENT DOCUMENTS

| | | |
|---|---|---|
| JP | 9-190254 | 7/1997 |
| JP | 11-195345 | 7/1999 |
| JP | 2000-119957 | 4/2000 |
| JP | 2000-126611 | 5/2000 |
| JP | 2000-271488 | 10/2000 |
| JP | 2000-327315 | 11/2000 |
| JP | 2002-47418 | 2/2002 |
| JP | 2003-39873 | 2/2003 |
| JP | 2003-334883 | 11/2003 |
| JP | 2004-2176 | 1/2004 |
| JP | 2004-26967 | 1/2004 |
| JP | 2004-135924 | 5/2004 |
| JP | 2004-262941 | 9/2004 |
| KR | 2002-0027509 | 4/2002 |
| WO | WO 01/91701 | 12/2001 |

OTHER PUBLICATIONS

Korean Office Action dated Jun. 11, 2010 (with its English translation).

* cited by examiner

PHOTOCATALYTIC APATITE-CONTAINING RESIN

CROSS-REFERENCE TO RELATED APPLICATIONS

This application is a Divisional Application of prior application Ser. No. 11/325,491 filed on filed Jan. 5, 2006, now U.S. Pat. No. 7,750,064 which is a continuation of international application PCT/JP04/09821 filed Jul. 9, 2004, the entire contents of which are incorporated herein by reference.

BACKGROUND OF THE INVENTION

1. Field of the Invention

The present invention relates to a resin containing an antibacterial agent, and specifically relates to a resin containing photocatalytic apatite.

2. Description of the Related Art

Mobile devices such as portable information devices, cellular phones, and the like come into contact with human hands, and thus dust and the like stick to these devices through grease of hands, tobacco tar, and the like. The grease of hands, tobacco tart, and dust allow various bacteria to proliferate. As a result, the appearances and cleanliness of mobile devices are impaired. On the other hand, interest in antibiotic properties is heightened, and thus an antibacterial measure is strongly required for casings, operational keys, and the like of potable information devices, cellular phones, etc. In general, titanium oxide ($TiO_2$) is used as an antibacterial agent. For example, a resin is mixed with titanium oxide to prepare a coating resin containing titanium oxide, and the coating resin is laminated on a casing resin through a protective film. Also, the surface of a key is coated with a coating resin containing titanium oxide. The key containing titanium oxide is described in Patent Documents 1 and 2:

Patent Document 1: Japanese Unexamined Patent Application Publication No. 9-102238
Patent Document 2: Japanese Unexamined Patent Application Publication No. 11-195345

Furthermore, microcapsules of titanium oxide are mixed in a resin to prepare a coating resin. A key using this coating resin is disclosed in Patent Document 3:

Patent Document 3: Japanese Unexamined Patent Application Publication No. 9-190254

However, in any one of Patent Documents 1 to 3, an antibacterial coating layer must be formed on a resin molding, and thus the number of the production steps is increased to increase cost. Furthermore, in Patent Documents 1 to 3, a coating film containing an antibacterial agent is scraped off little by little at each time of keying, and finally the film is completely removed to lose the antibacterial function.

A conceivable measure against this is to directly mix an antibacterial agent with a resin. However, this method cause deterioration in the resin used as a raw material due to titanium oxide used as the antibacterial agent. In other words, so-called chalking occurs, in which a resin surface is gradually floured with titanium oxide. It has recently been thought that like titanium oxide, photocatalytic apatite studied as an antibacterial agent alternative to titanium oxide also produces chalking. Therefore, as disclosed in Patent Document 4, even when photocatalytic apatite is used as an antibacterial agent, a coating resin is prepared and coated to form an antibacterial coating layer on a surface of a resin molding.

Patent Document 4: Japanese Patent Application No. 2002-146110

SUMMARY OF THE INVENTION

The inventor of the present invention found that photocatalytic apatite does not cause so-called chalking in which a resin is floured, and the invention is based on this finding.

An object of the present invention is to provide a resin capable of simply producing an antibiotic resin and decreasing the number of production steps and the production cost, without decreasing an antibacterial function even when a surface of the antibacterial resin is scraped off, and without causing chalking with an antibacterial agent.

The resin of the present invention contains photocatalytic apatite. As described above, photocatalytic apatite does not cause so-called chalking in which a resin is floured. Therefore, the photocatalytic apatite can be directly mixed in a resin, and thus the antibacterial function is not decreased even when a resin surface is scraped off. The resin containing photocatalytic apatite can be simply produced, thereby decreasing the number of the production steps and the cost. Also, the photocatalytic apatite has a strong force for decomposing fungus, bacteria, dust, and the like, i.e., a strong antibacterial force, in comparison to titanium oxide.

DESCRIPTION OF THE PREFERRED EMBODIMENT

Embodiments of the present invention will be described.

Figure 3:
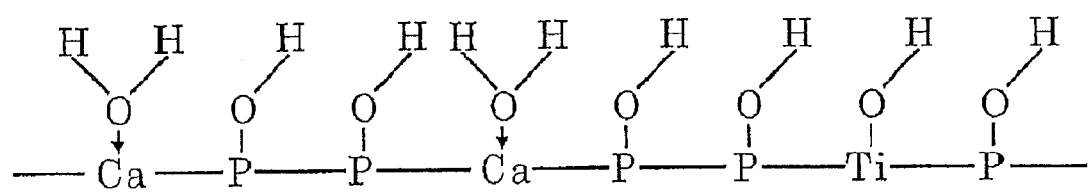
FIG. 3 is a drawing showing the schematic surface structure of a Ti—CaHAP crystal according to the present invention.

The photocatalytic apatite used in the present invention includes a metal oxide having a photocatalytic function and apatite bonded to the metal oxide in the atomic level. In the photocatalytic apatite, for example, titanium (Ti), zinc (Zn), tungsten (W), manganese (Mn), tin (Sn), indium (In), iron (Fe), or the like may be used as a metal element for exhibiting the photocatalytic function. Examples of the apatite constituting the basic structure of the photocatalytic apatite include hydroxyapatite, fluoroapatite, chloroapatite, and the like. FIG. 3 shows the schematic surface structure of a Ti—CaHAP (Ti—Ca Hydroxy Apatite) crystal including Ti selected as the metal and calcium hydroxyapatite selected as the apatite. This figure shows coordinate bonds between Ca and oxygen elements by arrows.

A process for producing a resin containing a resin and photocatalytic apatite will be described.

EXAMPLE (1) First, photocatalytic apatite (trade name PCAP-100, manufactured by Taihei Chemical Industrial Co., Ltd.) and a resin, specifically polypropylene (manufactured by Japan Polyolefin Co., Ltd.) were prepared. Three types of photocatalytic apatite having average particle diameters of 20 μm, 10 μm, and 5 μm, respectively, were prepared. Instead of the polypropylene, polyethylene, nylon, polyethylene terephthalate, polystyrene, polycarbonate, or the like can be used as the resin.

(2) Next, the prepared photocatalytic apatite and polypropylene were kneaded with a kneader (trade name KZW-15, manufactured by Technovel Corporation). The kneading conditions included 190° C. and 5 to 30 minutes. Under these conditions, the photocatalytic apatite and polypropylene were uniformly kneaded. Then, the kneaded product was cooled and then cut into pellets (diameter 2 mm×length 3 mm). According to this method, four samples 1, 2, 5, and 6 were prepared. Sample 3 other than these samples contained no antibacterial agent, and sample 4 contained titanium oxide. Details of these samples are shown in Table 1.

TABLE 1

Mixing ratio of sample

| Sample name | Resin type | Type of photocatalyst | Amount of photocatalyst added (wt %) | Particle diameter of photocatalyst (μm) |
|---|---|---|---|---|
| Sample 1 | Polypropylene | Ti—CaHAP | 10 | 20 |
| Sample 2 | Polypropylene | Ti—CaHAP | 3 | 10 |
| Sample 3 | Polypropylene | Not used | | |
| Sample 4 | Polypropylene | $TiO_2$ (titanium oxide) | 10 | 0.007 |
| Sample 5 | Polypropylene | Ti—CaHAP | 2 | 20 |
| Sample 6 | Polypropylene | Ti—CaHAP | 10 | 5 |

Sample 1 was prepared by adding 10 wt % of photocatalytic apatite (Ti—CaHAP) having a particle diameter of 20 μm as a photocatalyst to the polypropylene resin.

Sample 2 was prepared by adding 3 wt % of photocatalytic apatite (Ti—CaHAP) having a particle diameter of 10 μm as a photocatalyst to the polypropylene resin.

Sample 3 contained no photocatalyst added to the polypropylene resin.

Sample 4 was prepared by adding 10 wt % of titanium oxide having a particle diameter of 0.007 μm to the polypropylene resin.

Sample 5 was prepared by adding 2 wt % of photocatalytic apatite (Ti—CaHAP) having a particle diameter of 20 μm as a photocatalyst to the polypropylene resin.

Sample 6 was prepared by adding 10 wt % of photocatalytic apatite (Ti—CaHAP) having a particle diameter of 5 μm as a photocatalyst to the polypropylene resin.

(3) Next, the pellets of each of the six samples were formed in the shape described below using an injection molding machine (trade name SG-50, manufactured by Sumitomo Machinery Corporation). The injection molding conditions included a cylinder temperature of 190° C. and a mold temperature of 250° C. The shape of each sample was 12 mm in width, 70 mm in length, and 3 mm in thickness.

[Evaluation Test of Photocatalytic Active Force]

Figure 4:
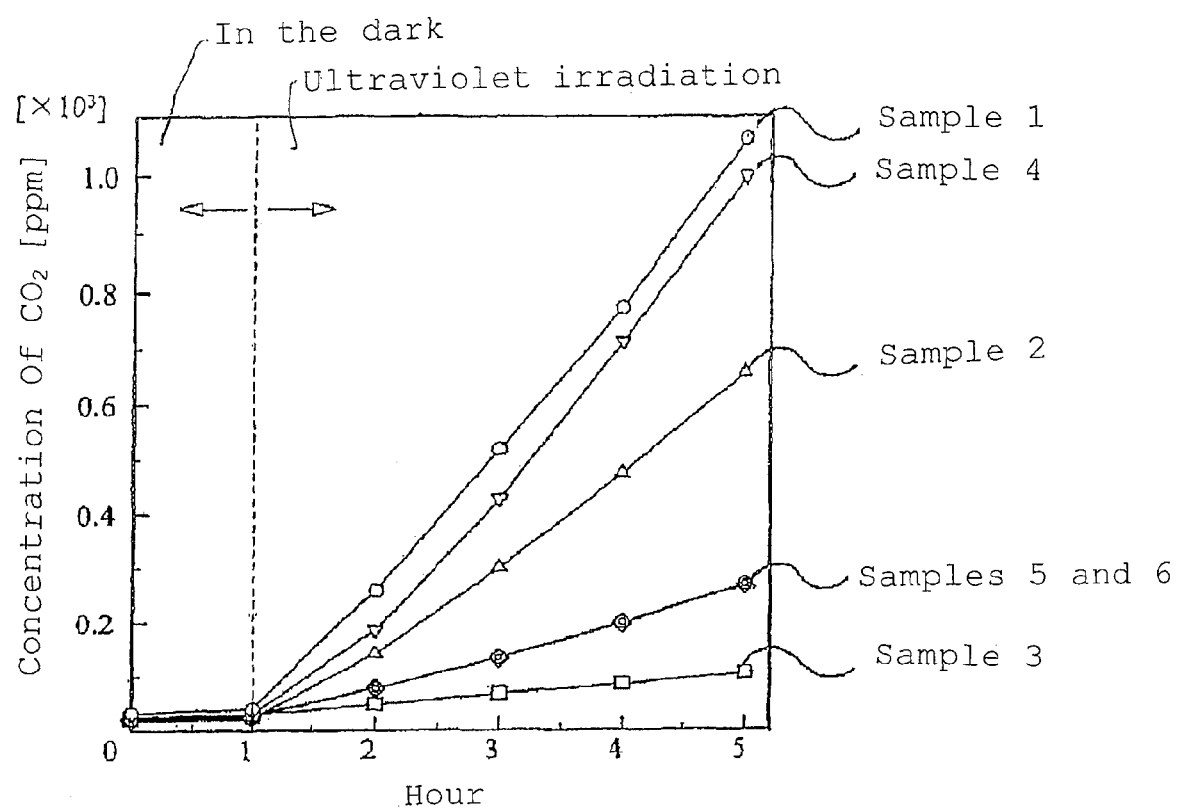
FIG. 4 is a graph showing the evaluation results of photocatalytic active force.

In an evaluation test method, 12 ml (at normal temperature and normal pressure) of aldehyde gas ($CH_3CHO$) was charged in an airtight container (500 cc) in which sample 1 was placed, and the container was allowed to stand for 1 hour in the dark. Then, the container was continuously irradiated with ultraviolet rays of 1 mW using an ultraviolet irradiator (trade name LuminarAce LA150-TX, manufactured by Hayashi Watch-Works Co., Ltd.). As a result, aldehyde ($CH_3CHO$) was decomposed into carbon dioxide and water by ultraviolet irradiation. The amount of the carbon dioxide produced by decomposition was measured at an interval of 1 hour by chromatography (trade name GC-390B, manufactured by GL Science Co.). The larger the amount of the carbon dioxide is, the higher the active force of the photocatalyst is. Similarly, samples 2 to 6 were evaluated by the same evaluation method. The results are shown in FIG. 4.

An appropriate criteria for decomposition ability was 0.1 ppm/hr or more. This is an appropriate value for decomposition of grease of hands, tobacco tar, organic dust, and like, which stick to a casing, a key top, and the like, in one night, i.e., up to a next day. Referring to FIG. 4, it is found that samples 1, 2, and 4 are suitable for a casing, a key top, and the like.

Next, an evaluation test of chalking was carried out for samples 1 to 6.

[Evaluation Test of Chalking]

Figure 5:
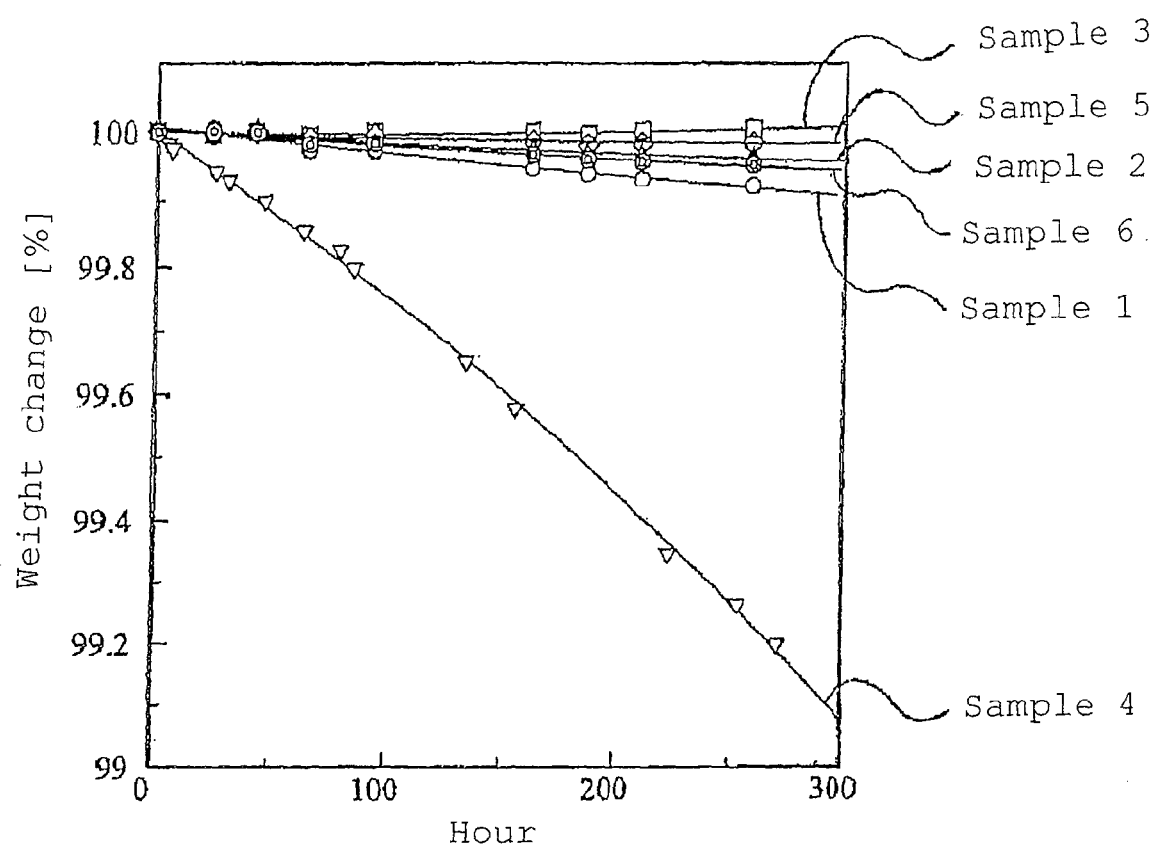
FIG. 5 is a graph showing the evaluation result of chalking.

In an evaluation test method for chalking, the ratio of a weight reduction due to flouring was measured. Specifically, each of samples 1 to 6 was placed in the dark and continuously irradiated with ultraviolet rays of 10 mW using an ultraviolet irradiator (trade name LuminarAce LA150-TX, manufactured by Hayashi Watch-Works Co., Ltd.). In this test, a weight change was measured at an interval of 100 hours. The results are shown in FIG. 5.

In the evaluation, the upper limit of a weight change of a product was set at about 99.5%. Therefore, samples 1, 2, 3, 5, and 6 were suitable resins. Among these samples, sample 3 showed no weight reduction because the resin contained no photocatalyst.

The results of the two evaluation tests indicate that samples 1 and 2 having high photocatalytic active force and causing little chalking are suitable for photocatalytic apatite-containing resin casings, photocatalytic apatite-containing resin keys, and the like. Such a photocatalytic apatite-containing resin can be applied to input devices coming into contact with human hands, such as a mouse, an input pen, a keyboard, and the like, as well as electronic device casings and mobile device casings.

First Embodiment

Next, a key top using a photocatalytic apatite-containing resin will be described.

Figure 1:
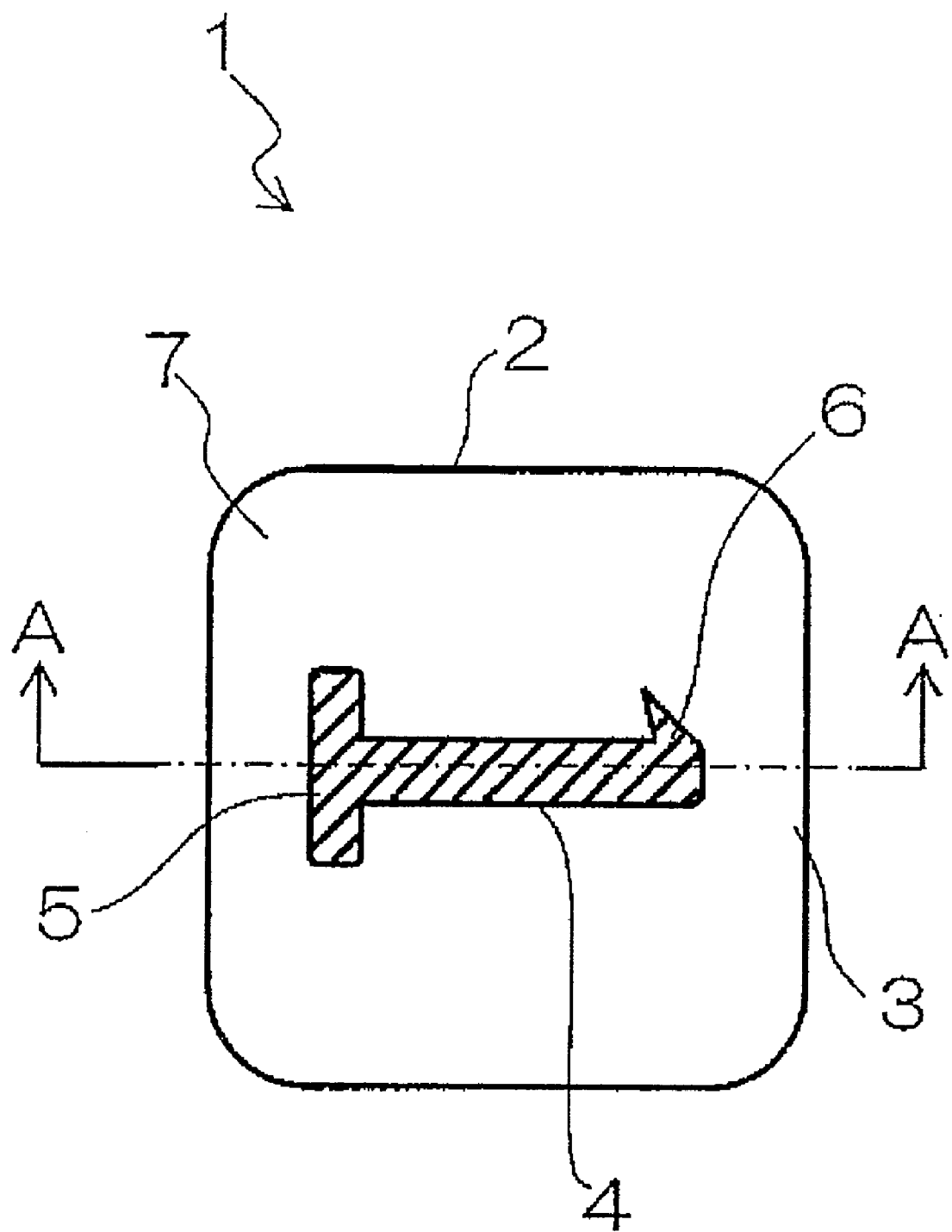
FIG. 1 is a schematic plan view showing the configuration of a key top according to an embodiment of the present invention.
Figure 2:
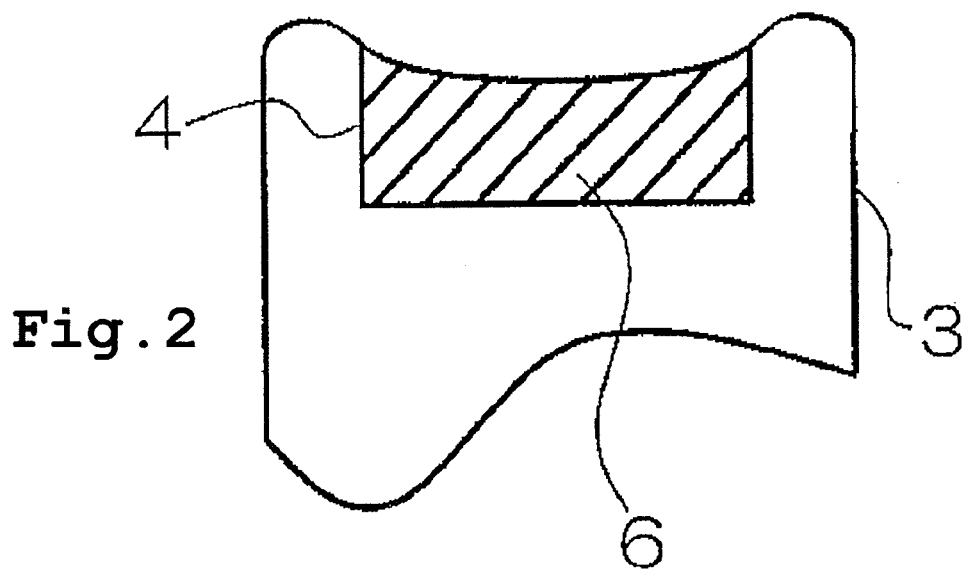
FIG. 2 is a schematic sectional view taken along line A-A in FIG. 1, as viewed from an arrow direction.

FIG. 1 shows the configuration of a key top according to an embodiment of the present invention. FIG. 2 is a sectional view taken along line A-A in FIG. 1. In the figures, reference numeral 1 denotes a key switch; reference numeral 2, a key top; reference numeral 3, a key top member; reference numeral 4, a graphic such as a character, a symbol, a pattern, or the like; reference numeral 5, a recess of the key top member; and reference numeral 6, an antibacterial agent mixture.

The key switch 1 has an individual meaning created by, for example, a character, numeral, symbol, pattern, or the like. When the key switch 1 is pressed, the pressing is detected by a contact point (not shown) so that a signal can be transmitted to the outside. The graphic such as a character, a numeral, a symbol, a pattern, or the like is displayed at the key top 2. In detail, the key top 2 roughly includes the key top member 3 and the graphic 4. The key top member 3 has a character, a numeral, a symbol, a pattern, or the like which is formed into a groove as the recess 5 at the top and the sides thereof. The graphic 4 is provided in the recess 5. For example, the graphic 4 shown in FIG. 1 is numeral "1". The key top member 3 is made of a resin, for example, an ABS resin which is made by blending acrylonitrile-styrene copolymers with a butadiene-acrylonitride rubber, or by interpolymerizing polybutadiene with styrene and acrylonitrile. The material of the graphic 4 is the antibacterial agent mixture 6 containing an antibacterial agent and a resin. The antibacterial agent mixture 6 is prepared by, for example, mixing a resin and photocatalytic apatite.

Next, a process for producing the key top will be described.

First, the graphic 4 is formed with an injection molding machine (trade name SICAP, manufactured by Sumitomo Machinery Corporation). The injection molding machine roughly includes a feed unit, a member mixing unit, a member heating unit, and an injection unit. Photocatalytic apatite (trade name Photocatalytic apatite PCAP-100, manufactured by Taihei Chemical Industrial Co., Ltd.) having an average particle diameter of 20 μm, ABS resin (trade name VD-200, manufactured by UMG Co., Ltd.), and a black pigment (trade name Sanodal Deep Black MLW, manufactured by Clariant Japan K. K.) are supplied to the feed unit. The black pigment is used for coloring a graphic and facilitates color discrimination from the key top member 3. Then, 85% by weight of the ABS resin, 10% by weight of the photocatalytic apatite, and 5% by weight of the black pigment are uniformly mixed in the member mixing unit. Next, the resultant mixture of the ABS resin, the photocatalytic apatite, and the black pigment is heat-melted in the member heating unit, and the melt mixture is injected into a mold from the injection unit to mold the antibacterial agent mixture 6. The cavity of the mold is previously formed in the same shape as that of the desired graphic 4. As a result, a photocatalytic apatite-containing resin is formed in the graphic 4.

Next, the key top member 3 is formed in the same manner as molding of the graphic 4. A mold having a cavity for forming the key top member 3 is prepared, and a material, specifically an antibacterial agent mixture 7 containing 80% by weight of the ABS resin and 20% by weight of the photocatalytic apatite, is injected into the mold from the injection unit in the same manner as described above. As a result, the key top member 3 made of the photocatalytic apatite-containing resin is formed. The graphic 4 is fitted into the recess 5 of the key top member 3.

In this embodiment, the photocatalytic apatite-containing resin is used for both the key top member 3 and the graphic 4. However, even when the photocatalytic apatite-containing resin is used for at least one of the key top member 3 and the graphic 4, an antibacterial effect can be achieved.

Second Embodiment

In the method of the first embodiment, the graphic 4 is fitted to the key top member 3. However, the key top 2 shown in FIG. 1 can be also obtained by a method in which a recess of a key top member is filled with paste of a photocatalytic apatite-containing resin and then dried and solidified by heating.

As described above, a photocatalytic apatite-containing resin of the present invention can be easily produced, thereby decreasing the number of production steps and the production cost. Also, even if a resin surface is scraped off, the antibacterial function is not decreased, and chalking with an antibacterial agent can be prevented.

What is claimed is:

1. A method of making a resin material comprising the steps of:
   mixing a resin and photocatalytic apatite, at a temperature higher than a softening point of the resin, so that the resin contacts directly and covers the photocatalytic apatite, the photocatalytic apatite having a chemical structure and photocatalytic function based on the chemical structure in which some of the calcium ions included in calcium phosphate are replaced by ions of a metal selected from the group consisting of titanium, zinc, tungsten, manganese, tin, indium, and iron.

2. A method of making a resin material according to claim 1, the resin selected from the group consisting of polypropylene, polyethylene, nylon, polyethylene terephthalate, polystyrene, polycarbonate and a resin which is made by blending acrylonitrile-styrene copolymers with a butadiene-acrylonitrile rubber, or by interpolymerizing polybutadiene with styrene and acrylonitrile.

3. A method of making a molded component made with a resin material comprising the steps of:
   mixing a resin and photocatalytic apatite, at a temperature higher than a softening point of the resin, so that the resin contacts directly and covers the photocatalytic apatite, the photocatalytic apatite having a chemical structure and photocatalytic function based on the chemical structure in which some of the calcium ions included in calcium phosphate are replaced by ions of a metal selected from the group consisting of titanium, zinc, tungsten, manganese, tin, indium, and iron; and
   molding a mixture of the resin and the photocatalytic apatite in a cavity of a mold.

4. An electronic device comprising:
   a component made of a resin and photocatalytic apatite which are mixed directly with each other, at a temperature higher than a softening point of the resin, so that the resin contacts directly and covers the photocatalytic, apatite, the photocatalytic apatite a chemical structure and photocatalytic function based on the chemical structure in which some of the calcium ions included in calcium phosphate are replaced by ions of a metal selected from the group consisting of titanium, zinc, tungsten, manganese, tin, indium, and iron.

5. An electronic device according to claim 4, wherein the electronic device is a computer, input device, or mobile device.

6. An electronic device according to claim 5, wherein the component is a key-top, a keyboard, a mouse or a casing of an electronic device.

7. A molded pellet comprising:
   a component made of a resin and photocatalytic apatite which are mixed directly with each other, at a temperature higher than a softening point of the resin, so that the resin contacts directly and covers the photocatalytic apatite, the photocatalytic apatite having a chemical structure and photocatalytic function based on the chemical structure in which some of the calcium ions included in calcium phosphate are replaced by ions of a metal selected from the group consisting of titanium, zinc, tungsten, manganese, tin, indium, and iron, the component being a pellet.

8. The method of claim 1, wherein the metal is selected from the group consisting of titanium, tungsten, manganese, tin, indium, and iron.

9. The electronic device of claim 4, wherein the metal is selected from the group consisting of titanium, tungsten, manganese, tin, indium, and iron.

10. The molded pellet of claim 7, wherein the metal is selected from the group consisting of titanium, tungsten, manganese, tin, indium, and iron.

* * * * *